(12) United States Patent
Ganesan et al.

(10) Patent No.: US 10,912,072 B2
(45) Date of Patent: Feb. 2, 2021

(54) BASE STATION AND USER EQUIPMENT FOR A WIRELESS COMMUNICATION NETWORK

(71) Applicant: HUAWEI TECHNOLOGIES CO., LTD., Shenzhen (CN)

(72) Inventors: Karthikeyan Ganesan, Munich (DE); Malte Schellmann, Munich (DE); Ali Ramadan Ali, Munich (DE); Swaroop Nunna, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/442,515

(22) Filed: Jun. 16, 2019

(65) Prior Publication Data

US 2019/0306844 A1 Oct. 3, 2019

Related U.S. Application Data

(63) Continuation of application No. PCT/EP2016/081507, filed on Dec. 16, 2016.

(51) Int. Cl.
*H04W 72/04* (2009.01)
*H04W 88/02* (2009.01)
(Continued)

(52) U.S. Cl.
CPC ..... *H04W 72/042* (2013.01); *H04W 72/0446* (2013.01); *H04W 72/0493* (2013.01);
(Continued)

(58) Field of Classification Search
CPC .......... H04W 72/0446; H04W 72/042; H04W 88/08; H04W 72/0493; H04W 88/02; H04L 5/0007
See application file for complete search history.

(56) References Cited

U.S. PATENT DOCUMENTS

2014/0226607 A1 8/2014 Holma et al.
2016/0309282 A1 10/2016 Xu et al.
(Continued)

FOREIGN PATENT DOCUMENTS

WO 2016064049 A1 4/2016

OTHER PUBLICATIONS

3GPP TR 38.913 V14.0.0; 3rd Generation Partnership Project; Technical Specification Group Radio Access Network; Study on Scenarios and Requirements for Next Generation Access Technologies; (Release 14); Oct. 2016; total 39 pages.
(Continued)

*Primary Examiner* — Brian D Nguyen
(74) *Attorney, Agent, or Firm* — Kilpatrick Townsend & Stockton LLP (57) ABSTRACT

The invention relates to a base station, including a first and a second communication service, in a wireless communication network on the basis of a plurality of communication resources, the base station comprising: a processor configured to allocate a first physical downlink control channel associated with the first communication service to a first service-specific control region of the plurality of communication resources and a second physical downlink control channel associated with the second communication service to a second service-specific control region of the plurality of communication resources, wherein the first service-specific control region is associated with a first service-specific user data region of the plurality of communication resources and the second service-specific control region is associated with a second service-specific user data region; and a communication interface configured to transmit to a user equipment a radio frame comprising plurality of communication resources.

15 Claims, 7 Drawing Sheets

(51) Int. Cl.
  *H04W 88/08*    (2009.01)
  *H04L 5/00*     (2006.01)

(52) U.S. Cl.
  CPC ........... *H04W 88/02* (2013.01); *H04W 88/08* (2013.01); *H04L 5/0007* (2013.01)

(56) References Cited

U.S. PATENT DOCUMENTS

| | | | | |
|---|---|---|---|---|
| 2018/0212732 | A1* | 7/2018 | You | H04L 5/0091 |
| 2018/0234998 | A1* | 8/2018 | You | H04L 5/0053 |
| 2018/0359068 | A1* | 12/2018 | Kim | H04W 72/14 |
| 2018/0376497 | A1* | 12/2018 | You | H04W 72/1284 |
| 2019/0045487 | A1* | 2/2019 | You | H04L 5/0044 |

OTHER PUBLICATIONS

R1-166148; Huawei, HiSilicon; sPDCCH design for short TTI; 3GPP TSG RAN WG1 Meeting #86; Gothenburg, Sweden Aug. 22-26, 2016; Agenda Item:7.2.12.2.1; total 7 pages.

Fantastic Benefits for a New Mobile Radio Standard; http://fantastic5g.com/wp-content/uploads/2016/06/FANTASTIC-5G_D31_public.pdf/; total 2 pages.

Xi Zhang et al; Filtered-OFDM—Enabler for Flexible Waveform in The 5th Generation Cellular Networks Published in IEEE Globecom, Chengdu Research and Development Centre, Huawei Technologies Co., Ltd., et al; San Diego, CA, Dec. 2015; total 6 pages.

Bala Alhaji Salihu et al; New Remapping Strategy for PDCCH Scheduling for LTE-Advanced Systems; Beijing University of Posts and Telecommunications and UTM-MIMOS Centre of Excellence (CoE) in Telecommunication Technology; Journal of Communications vol. 9, No, 7, Jul. 2014; total 9 pages.

Frank Schaich et al; Fantastic-5G: Novel, flexible air interface for enabling efficient multi-service coexistence for 5G below 6 GHz; total 10 pages.

Qin Mu et al; Search Space Design in Enhanced Physical Downlink Control Channel for LTE-Advanced; Docomo Beijing Communications Laboratories Co.,Ltd. et al; Vehicular Technology Conference (VTC Spring), 2013 IEEE 77th; total 5 pages.

R1-166103; Huawei, HiSilicon; Discussion on flexible frame structure with different numerologies; 3GFP SG RAN WG1 Meeting #86; Gothenburg, Sweden, Aug. 22-26, 2016; Agenda Item:8.1.3.2; total 5 pages.

Frank Schaich et al; On the Need for a New Air interface for 5G; IEEE COMSOC MMTC E-Letter; vol. 9, No. 5, Sep. 2014; total 4 pages.

3GPP TS 36.212 V12.5.0; 3rd Generation Partnership Project; Technical Specification Group Radio Access Network; Evolved Universal Terrestrial Radio Access (E-UTRA); Multiplexing arid channel coding; (Release 12); Jun. 2015; total 94 pages.

* cited by examiner

BASE STATION AND USER EQUIPMENT FOR A WIRELESS COMMUNICATION NETWORK

CROSS-REFERENCE TO RELATED APPLICATIONS

This application is a continuation of International Application No. PCT/EP2016/081507, filed on Dec. 16, 2016, the disclosure of which is hereby incorporated by reference in its entirety.

TECHNICAL FIELD

Generally, the present invention relates to the field of wireless or cellular communications. More specifically, the present invention relates to a base station and a user equipment for providing and using a plurality of communication services in a wireless communication network as well as corresponding methods.

BACKGROUND

It is foreseeable that future wireless (i.e. cellular) communication networks will have to provide its user equipments with a large variety of different communication services, which can include high bandwidth demanding communication services on the one hand as well as ultra-low latency communication services on the other hand (see, e.g. 3GPP, TR 38.913, "Study on Scenarios and Requirements for Next Generation Access Technologies"). For accessing these different communication services a user equipment generally has to monitor a common control region of a radio frame provided by a base station of a cellular communication network and perform blind decoding to detect whether or not there is control information for itself. Such a unified search space design increases the control data decoding complexity (high decoding latency & power consumption). For flexible frame structure design supporting mixed communication services, a unified search space can lead to search space overlap and Un-utilized Common Control Elements (CCE)s, because some communication services may require higher aggregation levels, as well as an increased UE blocking probability for low latency & high priority services due to insufficient resources for scheduling (see, e.g. "New Remapping Strategy for PDCCH Scheduling for LTE-Advanced Systems", Journal of Communications Vol. 9, No. 7, July 2014 and "Search Space Design in Enhanced Physical Downlink Control Channel for LTE-Advanced", Vehicular Technology Conference (VTC Spring), 2013 IEEE 77th).

Thus, there is a need for improved devices and methods for supporting and accessing a plurality of different communication services in a wireless communication network.

SUMMARY

It is an object of the invention to provide improved devices and methods for supporting and accessing a plurality of different communication services in a wireless communication network.

The foregoing and other objects are achieved by the subject matter of the independent claims. Further implementation forms are apparent from the dependent claims, the description and the figures.

The invention is based on the general idea of providing a service oriented search space design for UEs together with common search space that is decodable by all UEs. The common search space can provide, for instance, system information, paging, and/or random access handling. The service oriented search spaces can provide control information for specific services, such eV2x services with low latency and others requiring massive access.

More specifically, according to a first aspect the invention relates to a base station configured for a plurality of communication services, including a first communication service and a second communication service, in a wireless communication network on the basis of a plurality of communication resources, the base station comprising:

a processor configured to allocate a first physical downlink control channel (herein also referred to as first "sPDCCH") associated with the first communication service to a first service-specific control region (also referred to as first service-specific search space) of the plurality of communication resources and a second physical downlink control channel (herein referred to as second "sPDCCH") associated with the second communication service to a second service-specific control region (also referred to as second service-specific search space) of the plurality of communication resources, wherein the first service-specific control region is associated with a first service-specific user data region of the plurality of communication resources and the second service-specific control region is associated with a second service-specific user data region of the plurality of communication resources; and a communication interface configured to transmit to a user equipment a radio frame comprising the plurality of communication resources.

Thus, an improved base station is provided, which is configured to support a plurality of communication services in a wireless communication network in an efficient way. By providing service-specific search spaces the blind decoding of control information by a user equipment can be done more efficiently. More specifically, from the perspective of a user equipment, instead of blindly decoding a very large search space, it needs to decode only a less complex, compact search space depending on its own service needs. Moreover, a user equipment does not need to decode a service-specific search space at all, if there is no service notified, for instance, by the RRC layer.

The plurality of communication resources can be a plurality of frequency-time resource blocks of the radio frame. In an embodiment, each control region can support a different CCE scheduling algorithm which is optimal for that particular service.

In a first possible implementation form of the base station according to the first aspect as such, the processor is further configured to allocate a common physical downlink control channel to a common control region (herein referred to as a common search space) of the plurality of communication resources of the radio frame.

Thus, a common search space for all user equipments is provided.

In a second possible implementation form of the base station according to the first aspect as such or the first implementation form thereof, the processor is further configured to allocate a physical control service indicator channel (PCSICH) to a common control region of the plurality of communication resources of the radio frame, wherein the physical control service indicator channel (PCSICH) comprises information about the location of the first service-specific control region and the second service-specific control region in the radio frame.

Thus, an "extended" PCFICH is provided, which is herein referred to as PCSICH. In an implementation form, the locations of the first and second control regions in the radio frame can be determined on the basis of RNTIs.

In a third possible implementation form of the base station according to the first aspect as such or the first or second implementation form thereof, the first service-specific control region and user data region are located in a first tile of the plurality of communication resources and the second service-specific control region and user data region are located in a second tile of the plurality of communication resources.

In a fourth possible implementation form of the base station according to the third implementation form of the first aspect, the processor is further configured to configure the first tile with different tile parameters than the second tile, in particular with a different sampling frequency, a different number of sub-carriers and/or a different sub-carrier spacing.

Thus, different tiles associated with different services can have different "numerologies" adapted to the respective service.

In a fifth possible implementation form of the base station according to the first aspect as such or any one of the first to fourth implementation form thereof, the plurality of communication resources are associated with a plurality of frequencies defining a frequency range and wherein the processor is configured to allocate the first physical downlink control channel (sPDCCH) and/or second first physical downlink control channel (sPDCCH) at different, in particular lower frequencies of the frequency range than the first service-specific user data region and/or the second service-specific user data region.

Thus, advantageously a low frequency component carrier can be used as "controller".

In a sixth possible implementation form of the base station according to the first aspect as such, the processor is further configured to provide a level 1 downlink control region (in particular DCI) in the control region of a first OFDM symbol of the radio frame, wherein the level 1 downlink control region comprises information about service-specific level 2 downlink control regions, in particular level 2 DCIs.

According to a second aspect the invention relates to a corresponding method of operating a base station configured for a plurality of communication services, including a first communication service and a second communication service, in a wireless communication network on the basis of a plurality of communication resources, the method comprising:

allocating a first physical downlink control channel (sPDCCH) associated with the first communication service to a first service-specific control region (herein also referred to as first service-specific search space) of the plurality of communication resources and a second physical downlink control channel (sPDCCH) associated with the second communication service to a second service-specific control region (herein also referred to as second service-specific search space) of the plurality of communication resources, wherein the first service-specific control region is associated with a first service-specific user data region of the plurality of communication resources and the second service-specific control region is associated with a second service-specific user data region of the plurality of communication resources; and transmitting to a user equipment a radio frame comprising the plurality of communication resources.

The method according to the second aspect of the invention can be performed by the base station according to the first aspect of the invention. Further features of the method according to the second aspect of the invention result directly from the functionality of the base station according to the first aspect of the invention and its different implementation forms.

According to a third aspect the invention relates to a user equipment configured to use one or more of a plurality of communication services, including a first communication service and a second communication service, in a wireless communication network on the basis of a plurality of communication resources, the user equipment comprising:

a communication interface configured to receive from a base station of the cellular communication network a radio frame comprising the plurality of communication resources; and a processor configured to decode a first physical downlink control channel (sPDCCH) associated with the first communication service by accessing a first service-specific control region (i.e. search space) of the plurality of communication resources and to decode a second physical downlink control channel (sPDCCH) associated with the second communication service by accessing a second service-specific control region (i.e search space) of the plurality of communication resources, wherein the first service-specific control region is associated with a first service-specific user data region of the plurality of communication resources and the second service-specific control region is associated with a second service-specific user data region of the plurality of communication resources.

Thus, an improved user equipment is provided, which is configured to use a plurality of communication services in a wireless communication network in an efficient way. By providing service-specific search spaces the decoding of control information by the user equipment can be done more efficiently.

In a first possible implementation form of the user equipment according to the third aspect as such, the processor is further configured to decode a common physical downlink control channel by accessing a common control region (also referred to as common search space) of the plurality of communication resources of the radio frame.

In a second possible implementation form of the user equipment according to the third aspect as such or the first implementation form thereof, the processor is further configured to decode a physical control service indicator channel (PCSICH) by accessing a common control region of the plurality of communication resources of the radio frame, wherein the physical control service indicator channel (PCSICH) comprises information about the location of the first service-specific control region and the second service-specific control region in the radio frame.

In a third possible implementation form of the user equipment according to the third aspect as such or the first or second implementation form thereof, the first service-specific control region and (the corresponding) user data region are located in a first tile of the plurality of communication resources and the second service-specific control region and (the corresponding) user data region are located in a second tile of the plurality of communication resources.

In a fourth possible implementation form of the user equipment according to the third implementation form of the third aspect, the processor is further configured to process the first tile with different tile parameters than the second tile, in particular with a different sampling frequency, a different number of sub-carriers and/or a different sub-carrier spacing.

In a fifth possible implementation form of the user equipment according to the third aspect as such or any one of the first to fourth implementation form thereof, the plurality of communication resources are associated with a plurality of frequencies defining a frequency range and wherein the processor is configured to decode the first physical downlink control channel (sPDCCH) and/or second first physical downlink control channel (sPDCCH) at different, in particular lower frequencies of the frequency range than the first service-specific user data region and/or the second service-specific user data region.

According to a fourth aspect the invention relates to a corresponding method of operating a user equipment configured to use one or more of a plurality of communication services, including a first communication service and a second communication service, in a cellular communication network on the basis of a plurality of communication resources, the method comprising:

receiving from a base station of the cellular communication network a radio frame comprising the plurality of communication resources;

decoding a first physical downlink control channel (sPDCCH) associated with the first communication service by accessing a first service-specific control region (i.e. search space) of the plurality of communication resources; and decoding a second physical downlink control channel (sPDCCH) associated with the second communication service by accessing a second service-specific control region (i.e. search space) of the plurality of communication resources;

wherein the first service-specific control region is associated with a first service-specific user data region of the plurality of communication resources and the second service-specific control region is associated with a second service-specific user data region of the plurality of communication resources.

The method according to the fourth aspect of the invention can be performed by the user equipment according to the third aspect of the invention. Further features of the method according to the fourth aspect of the invention result directly from the functionality of the user equipment according to the third aspect of the invention and its different implementation forms.

According to a fifth aspect the invention relates to a computer program comprising program code for performing the method according to the second aspect or the method according to the fourth aspect when executed on a computer.

The invention can be implemented in hardware and/or software.

BRIEF DESCRIPTION OF DRAWINGS

Further embodiments of the invention will be described with respect to the following figures, wherein.

In the various figures, identical reference signs will be used for identical or at least functionally equivalent features.

DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
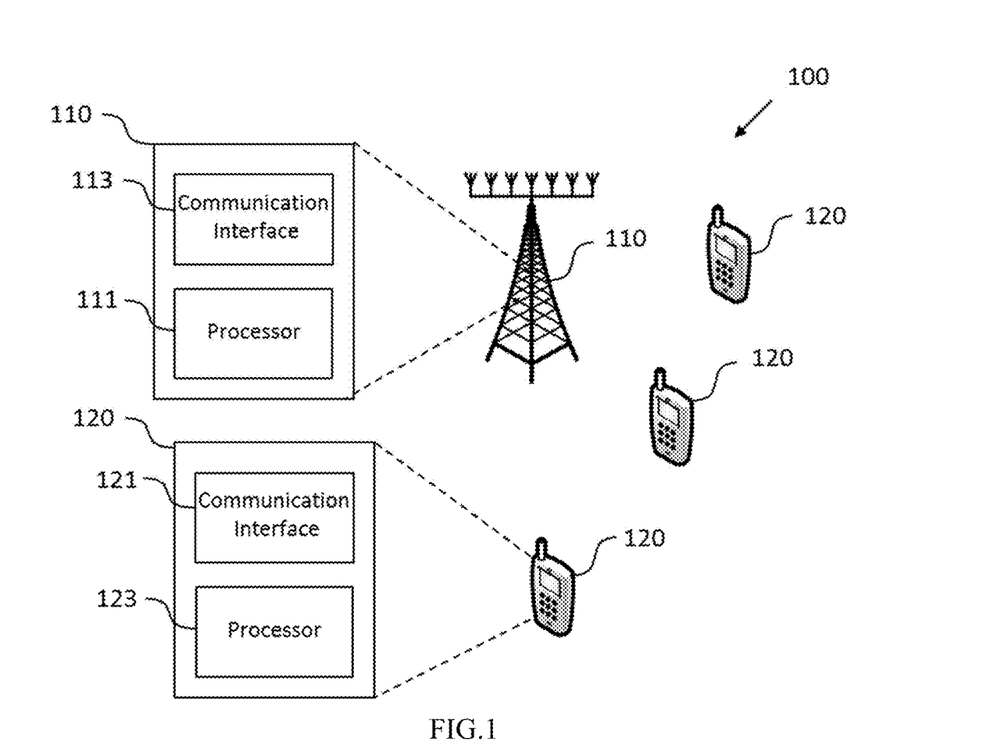
FIG. 1 shows a simplified block diagram of a wireless communication network comprising a base station according to an embodiment and several user equipments according to an embodiment.

FIG. 1 shows a simplified block diagram illustrating a wireless or cellular communication network 100 comprising a base station (BS) 110 and a plurality of user equipments 120. The user equipments (UEs) 120 may be fixed or mobile and may be referred to by other names such as mobile stations (MS), mobile user equipments (MT), subscriber station (SS), wireless device, personal digital assistant (PDA), wireless modem, handheld device and the like. The base station 110 generally refers to a fixed station that communicates with the user equipments 120 and may be called by other names such as evolved-NodeB (eNB), base transceiver system (BTS), access point (AP), and the like.

The base station 110 is configured to provide a plurality of communication services for the user equipments 120, including a first communication service and a second communication service, in the wireless communication network 100 on the basis of a plurality of communication resources. As will be explained in more detail further below, in an embodiment the plurality of communication resources can be a plurality of frequency-time resource blocks of a radio frame used for communication between the base station 110 and the user equipments 120.

As can be taken from the enlarged view of FIG. 1, the base station 110 comprises a processor 111 and a communication interface 113 and the user equipment 120 comprises a processor 123 and a communication interface 121.

The processor 111 of the base station 110 is configured to allocate a first physical downlink control channel (herein also referred to as first "sPDCCH" for "service-specific physical downlink control channel") associated with the first communication service to a first service-specific control region (also referred to as first service-specific search space) of the plurality of communication resources and a second physical downlink control channel (herein referred to as second "sPDCCH") associated with the second communication service to a second service-specific control region (also referred to as second service-specific search space) of the plurality of communication resources, wherein the first service-specific control region is associated with a first service-specific user data region of the plurality of communication resources and the second service-specific control region is associated with a second service-specific user data region of the plurality of communication resources.

The communication interface 113 of the base station 110 is configured to transmit to the user equipments 120 a radio frame comprising the plurality of communication resources. The communication interface 121 of the user equipment 120, in turn, is configured to receive such a radio frame comprising the plurality of communication resources.

The processor 123 of the user equipment is configured to decode the first physical downlink control channel (sPDCCH) associated with the first communication service by accessing the first service-specific control region (i.e. search space) of the plurality of communication resources and to decode the second physical downlink control channel (sPDCCH) associated with the second communication service by accessing the second service-specific control region (i.e search space) of the plurality of communication resources. As already described in the context of the base station 120, the first service-specific control region is associated with a first service-specific user data region of the plurality of communication resources and the second service-specific control region is associated with a second service-specific user data region of the plurality of communication resources.

Figure 2:
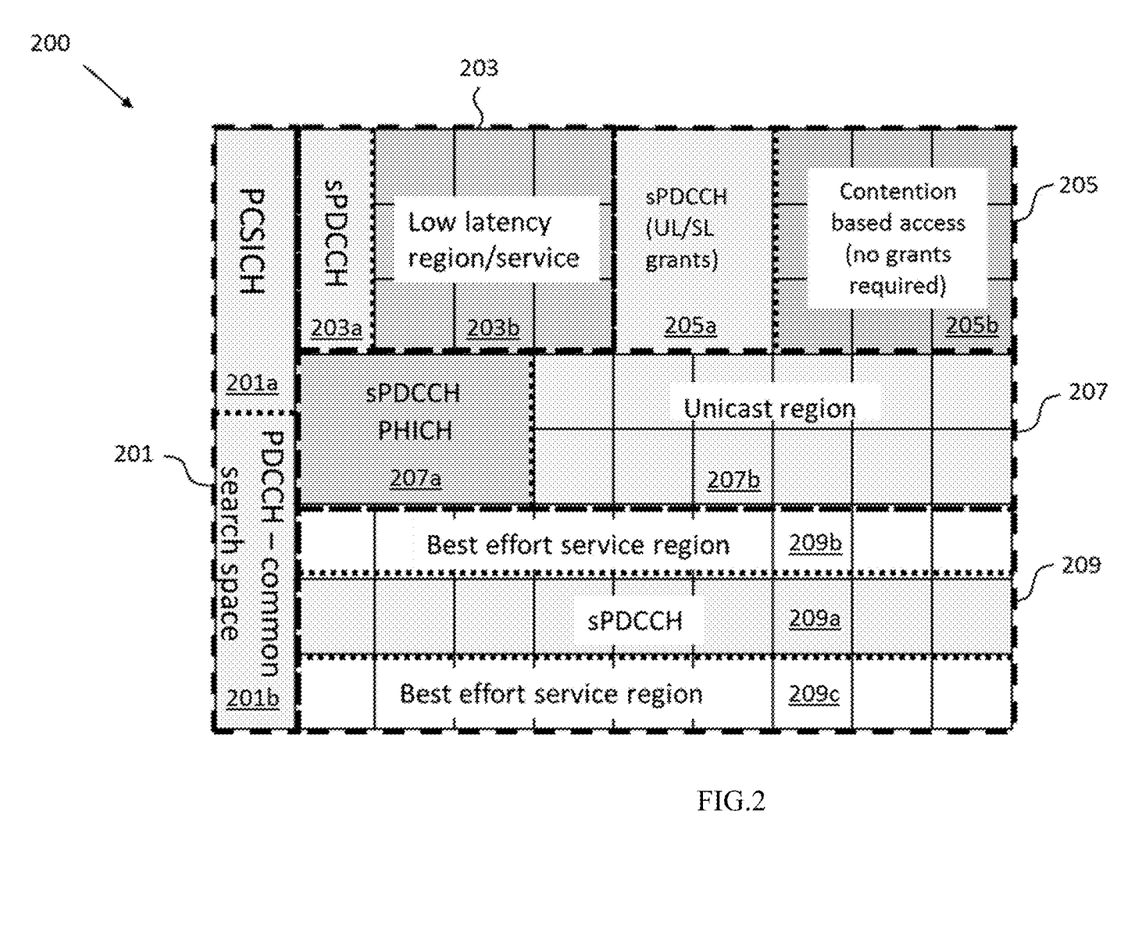
FIG. 2 shows a simplified block diagram illustrating a radio frame comprising a plurality of communication resources as exchanged between a base station according to an embodiment and a user equipment according to an embodiment.

FIG. 2 shows a simplified block diagram illustrating the plurality of communication resources of an exemplary radio frame 200 as exchanged between the base station 110 and the user equipment 120, wherein the plurality of communication resources are a plurality of frequency-time resource blocks or resource elements. In an embodiment, the plurality of communication resources can comprise a plurality of orthogonal frequency division multiplexing (OFDM) symbols in a time domain and a plurality of subcarriers in the frequency domain. A resource block can include a plurality of continuous subcarriers in a slot. The schematic diagram shown in FIG. 2 is also referred to as a resource grid. The resource grid can comprise resource blocks or resource elements. In an embodiment, the resource elements on the resource grid can be identified by a pair of indexes in a slot. A first index can define a subcarrier index in the frequency domain, and a second index can define an OFDM symbol index in the time domain.

The plurality of communication resources shown in FIG. 2 comprises a physical control service indicator channel (PCSICH) 201a. The PCSICH 201a can be considered to be an extension of the conventional physical control format indicator channel (PCFICH).

In the embodiment of FIG. 2, the PCSICH 201a is allocated to a common control region 201 of the plurality of communication resources of the radio frame 200, i.e. a control region decoded by all user equipments 120. In an embodiment, the common control region 201 can comprise a conventional physical control service indicator channel (PDCCH) 201b. In an embodiment, the location and size of the common control region (i.e. search space) 201 can be predefined limited to the first OFDM symbol. In an embodiment, the common search space 201 can comprise a predefined resource elements allocation with a default numerology.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. The PDCCH can be transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH can be determined according to an associative relation between the number of the CCEs and a coding rate provided by the CCEs.

In an embodiment, the PCSICH 201a can comprise information about the location of different service-specific control regions, i.e. sPDCCHs, of the radio frame 200. In other words, in an embodiment, the location of the service-specific search spaces could be dynamic and signaled by the PCSICH 201a, which can be considered to be part of the common control channel. In an embodiment, the service-specific search spaces could be located at a fixed position.

For instance, in the embodiment of FIG. 2, the PCSICH 201a can comprise information about the location of a service-specific control region, i.e. sPDCCH 203a for a low latency service, a service-specific control region, i.e. sPDCCH 205a for contention based access, a service-specific control region, i.e. sPDCCH 207a for unicast, and a service-specific control region, i.e. sPDDCH 209a for a best effort service. The different service-specific physical control service indicator channels (sPDCCH) or control regions 203a, 205a, 207a, 209a can be configured as a conventional PDCCH. Each service-specific physical control service indicator channel (sPDCCH) or control region 203a, 205a, 207a, 209a is associated with a corresponding service-specific user data region, i.e. provides a link to the corresponding service-specific user data region. In the embodiment shown in FIG. 2, the service-specific physical control service indicator channel (sPDCCH) 203a is associated with the corresponding service-specific user data region 203b, the service-specific physical control service indicator channel (sPDCCH) 205a is associated with the corresponding service-specific user data region 205b, the service-specific physical control service indicator channel (sPDCCH) 207a is associated with the corresponding service-specific user data region 207b, and the service-specific physical control service indicator channel (sPDCCH) 209a is associated with the corresponding service-specific user data regions 209b and 209c.

In an embodiment, a service-specific physical control service indicator channel (sPDCCH), for instance, the sPDCCH 203a, and its associated service-specific user data region, for instance, the user data region 203b, can define a tile of the radio frame 200. In an embodiment, different tiles of the radio frames can have different tile parameters or numerologies, such as different sampling frequencies, different numbers of sub-carriers and/or different sub-carrier spacings. The term "numerology" defines a set of transmission parameters which are usually determined by hardware system requirements. Tuning of such parameters is performed within limits dictated by the hardware. For example, in an LTE (Long Term Evolution) environment with 15 kHz subcarrier spacing, FFTs (Fast Fourier Transforms) can be easily implemented if the operating subcarrier spacing is a multiple of the base subcarrier spacing of 15 KHz. Thus, increasing the subcarrier spacing by factors of 2 (30, 60 kHz, etc.) facilitates the implementation of the hardware design. Such approaches are proposed in 3GPP standardization for 5G. More details about tiles can be found, for instance, in publications of the Fantastic (flexible air interface for scalable service delivery within wireless communication networks) 5G project, for instance, at the following URL: http://fantastic5g.eu/wp-content/uploads/2016/06/FANTASTIC-5G_D31_public.pdf.

As already mentioned above, the PCSICH 201a can provide information about the number of tiles with numerology settings for each, can provide a pointer to the respective location of a service-specific sPDCCH for each service with information like PHICH scale factor, candidates & aggregation level for service specific search space. Some tiles may not have PHICH, because of no ack/nack feedback due to broadcast/multicast traffic. Therefore, more CCE can be allocated for a sPDCCH. Moreover, the PCSICH 201a can provide a region for contention based access.

In an embodiment, the base station 110 can determine a PDCCH format according to a DCI to be transmitted to the UE 120, and attaches a cyclic redundancy check (CRC) to the DCI. A unique radio network temporary identifier (RNTI) can be masked on the CRC according to the owner or the purpose of the PDCCH. In case of a PDCCH for a particular UE 120, a unique identifier, e.g., a cell-RNTI (C-RNTI), of the UE 120, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 3:
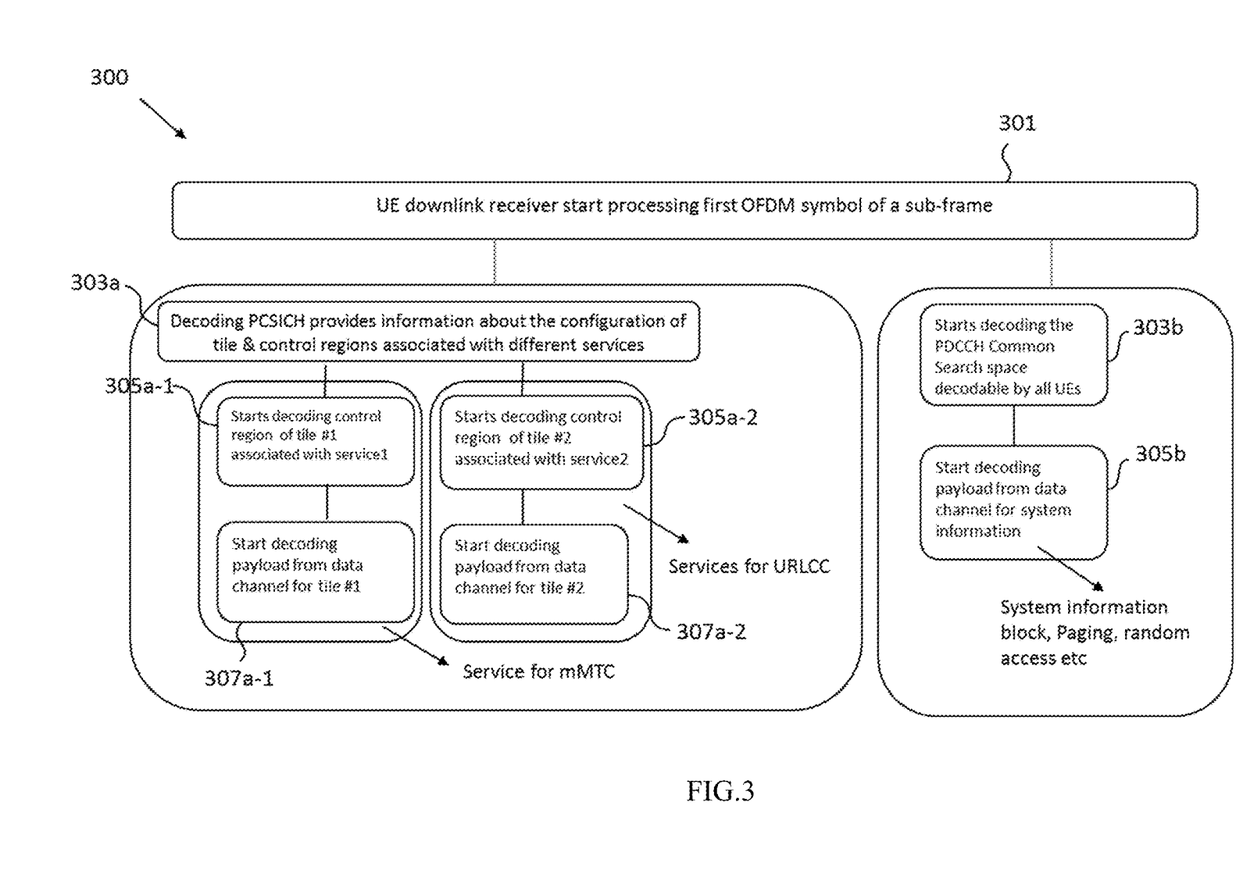
FIG. 3 shows a flow diagram illustrating decoding steps performed by a user equipment according to an embodiment.

FIG. 3 shows a flow diagram illustrating several decoding steps of a decoding scheme 300 performed by the user equipment 120 (or the processor 123 thereof), when receiving the radio frame shown in FIG. 2, according to an embodiment.

In a step 301, the UE 120 starts processing the radio frame 200 (in particular a first OFDM symbol of a sub-frame thereof). In a step 303a, the UE 120 decodes the PCSICH 201a for obtaining information about the different tiles 203, 205, 207, 209 of the radio frame 200, in particular their respective configuration, as well as their service-specific search spaces, i.e. control regions 203a, 205a, 207a and 209a. On the basis of this information the UE 120 can start decoding the search space(s) of any service the UE 120 wants to use (see step 305a-1 for a first mMTC service and step 305a-2 for a second URLCC service). For instance, in case the UE 120 wants to use the ultra reliable low latency communication (URLCC) service, it will start decoding the service-specific search spaces 203a of the URLCC service tile 203 on the basis of the information provided in the PCSICH 201a. After decoding the search space(s) of any service the UE 120 wants to use, the UE 120 will start decoding the payload in the corresponding service-specific user data region(s) (see steps 307a-1 and 307a-2 of FIG. 3).

In parallel to the decoding of the PCSICH 201a and any service-specific search spaces 203a, 205a, 207a, 209a the UE 120 in step 303b can start decoding the common control region 201b, i.e. the common physical control service indicator channel (PDCCH) 201b as well as the payload from the corresponding data channel providing, for instance, system information, such as a system information block, paging information, random access information and the like (see step 305b o FIG. 3).

Figure 4:
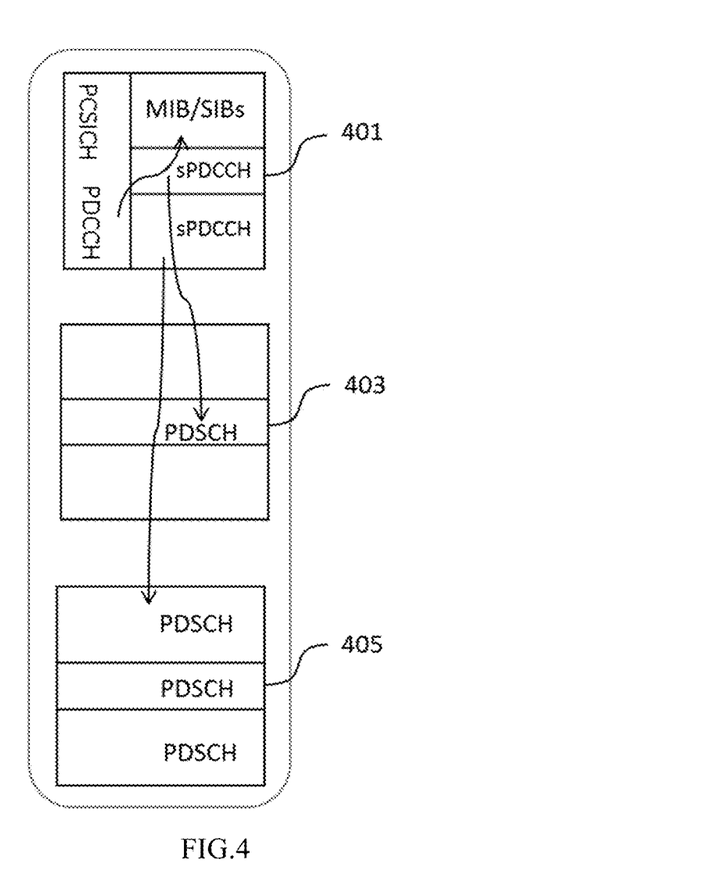
FIG. 4 shows a plurality of communication resources as used by a base station according to an embodiment and a user equipment according to an embodiment.

In an embodiment, the plurality of communication resources are associated with a plurality of frequencies defining a frequency range and the first physical downlink control channel (sPDCCH) and/or second first physical downlink control channel (sPDCCH]) can be located at different, in particular lower frequencies of the frequency range than the first service-specific user data region and/or the second service-specific user data region. In other words, according to an embodiment service specific control regions are located in a primary carrier or at lower frequency providing control information to the rest of the carriers. This is illustrated in FIG. 4 by means of the sets of multiple component carriers (CCs) 401, 403 and 405 distributed over a fragmented spectrum. In an embodiment, split RAN with one component carrier can act as a controller (for instance, lower frequency band such as 700 MHz component carrier can act as controller) to provide service-specific search spaces for the rest of the CCs carrying data channels as shown in FIG. 4. Thus, service-specific search spaces are provided to each or group of service specific component carriers.

In other words, in an embodiment a first OFDM symbol can contain the PCSICH and PDCCH for the common search space. The PCSICH can provide the location of the service-specific search space present in the low frequency carrier (sPDCCH), whereas PDCCH-common search space provides the location for decoding system information blocks, random access, paging as well as other future common control functionality.

Figure 5:
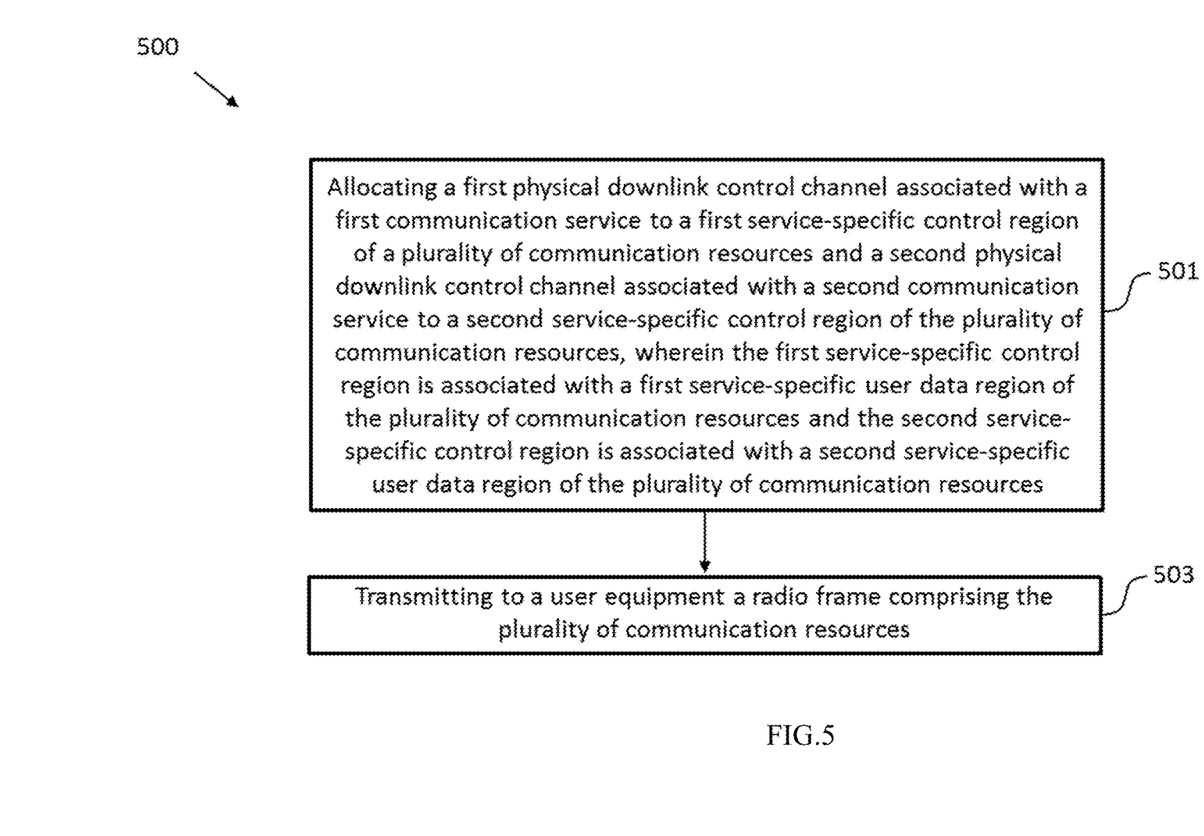
FIG. 5 shows a flow diagram illustrating a method for operating a base station according to an embodiment.

FIG. 5 shows a flow diagram illustrating a method 500 for operating the base station 110 according to an embodiment.

The method 500 comprises a first step 501 of allocating a first physical downlink control channel (sPDCCH) associated with the first communication service to a first service-specific control region of the plurality of communication resources and a second physical downlink control channel (sPDCCH) associated with the second communication service to a second service-specific control region of the plurality of communication resources, wherein the first service-specific control region is associated with a first service-specific user data region of the plurality of communication resources and the second service-specific control region is associated with a second service-specific user data region of the plurality of communication resources.

The method 500 comprises a further step 503 of transmitting to the user equipment 120 a radio frame comprising the plurality of communication resources, such as the radio frame 200 shown in FIG. 2.

Figure 6:
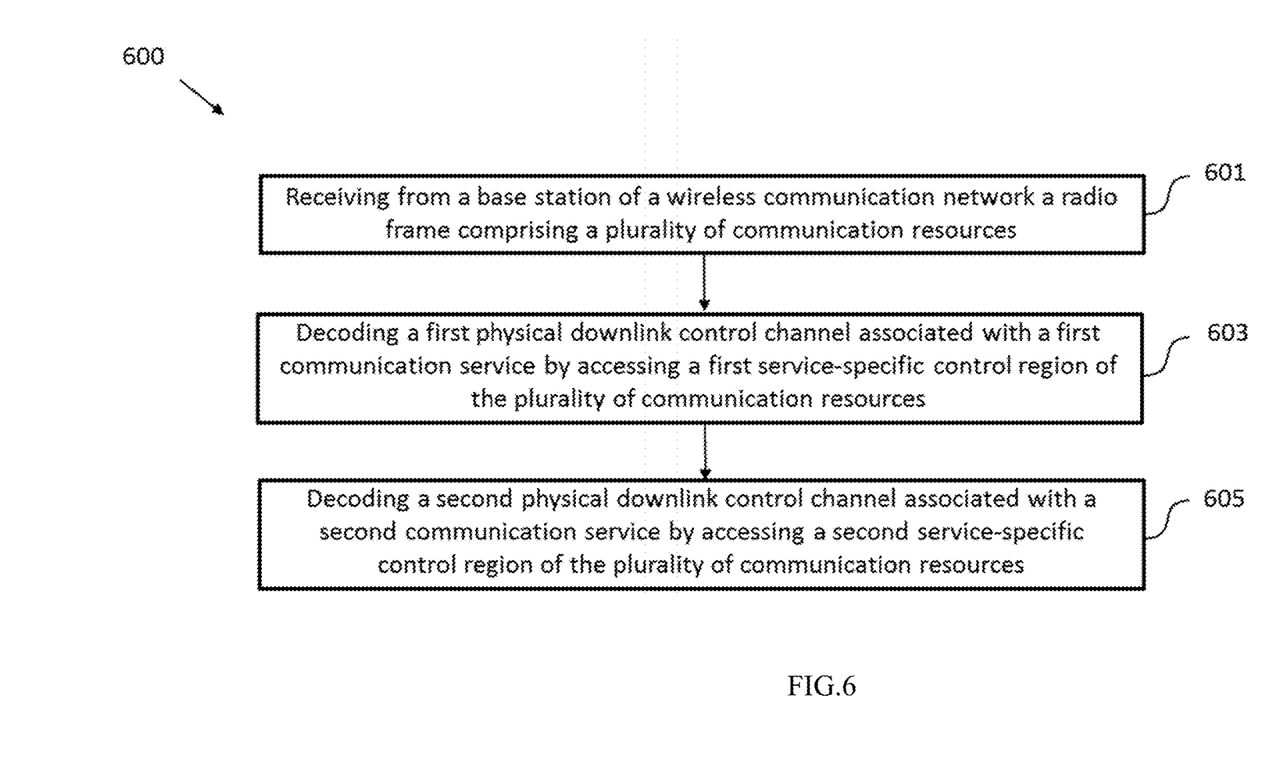
FIG. 6 shows a flow diagram illustrating a method for operating a user equipment according to an embodiment.

FIG. 6 shows a flow diagram illustrating a method 600 for operating a user equipment 120 according to an embodiment.

The method 600 comprises a first step 601 of receiving from the base station 110 of the cellular communication network 100 a radio frame comprising the plurality of communication resources, such as the radio frame 200 shown in FIG. 2.

The method 600 comprises a further step 603 of decoding a first physical downlink control channel (sPDCCH) associated with the first communication service by accessing a first service-specific control region of the plurality of communication resources, wherein the first service-specific control region is associated with a first service-specific user data region of the plurality of communication resources.

The method 600 comprises a further step 605 of decoding a second physical downlink control channel (sPDCCH) associated with the second communication service by accessing a second service-specific control region of the plurality of communication resources, wherein the second service-specific control region is associated with a second service-specific user data region of the plurality of communication resources.

Figure 7:
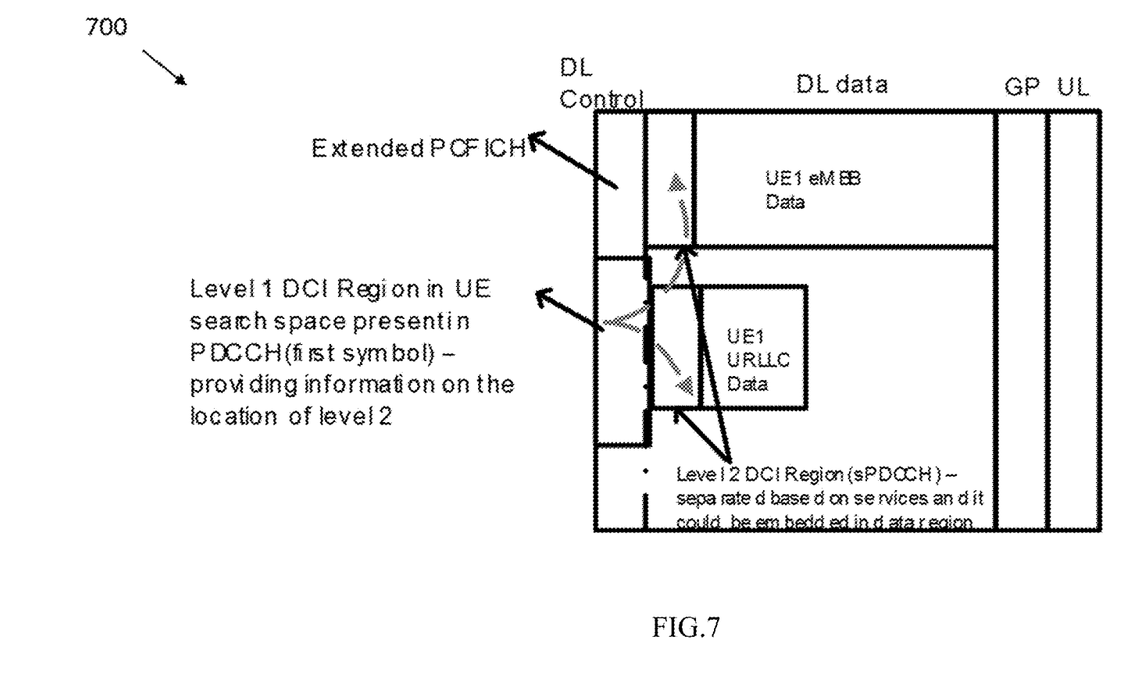
FIG. 7 shows a simplified block diagram illustrating a further radio frame comprising a plurality of communication resources as exchanged between a base station according to an embodiment and a user equipment according to an embodiment.

FIG. 7 shows a simplified block diagram illustrating a further radio frame 700 comprising a plurality of communication resources as exchanged between the base station 110 according to an embodiment and the user equipment 120 according to an embodiment. In the radio frame 700 shown in FIG. 7 the UE search space present in the first OFDM symbol of a sub-frame contains a level 1 downlink control region (DCI) providing information about level 2 DCIs, which is separated based on services. The level 2 control regions could be embedded in their respective data regions. More specifically, the frame 700 shown in FIG. 7 consists of a downlink control region (first OFDM symbol), downlink data regions, guard symbols as well as uplink data/control symbols. In an embodiment the extended PCFICH provides information on the frame configuration. The UE specific control region is present in the first OFDM symbol and provides information about the level 2 control region of the user equipment 120 (referred to as UE1 in FIG. 7) for different services (in this example URLCC (ultra reliable low latency communication) service & eMBB (enhanced mobile broadband) service). The level 2 control regions could be embedded in their respective data regions.

Embodiments of the invention provide for a dynamic adaptation of the UE search positions and spaces for its PHY control signaling, which is beneficial in terms of flexibility in the PHY layer for DL/UL, beamforming and the like. Embodiments of the invention support mixed services, such as low latency and other services requiring massive access.

Embodiments of the invention provide a service oriented search space design for 5G with 100/500 MHz bandwidth enabling lower complexity and compact search space design aimed at reducing the PDCCH blind decoding attempts, which can enable fast decoding and thus can reduce the latency. In addition, reducing the number of blind decoding is especially beneficial for the scenarios of carrier aggregation or large bandwidth.

The PDCCH search space allocation provided by embodiments of the invention can be designed to suit the need of the respective service. For instance, the service-specific search space for a high priority low latency service could be designed to have a lower blocking probability.

Embodiments of the invention eliminate the need of decoding the entire search space for lower latency services. A UE needs to decode a smaller search space depending on its configured services from the RRC layer. In case of eV2x service with cellular assisted UL/SL transmission, the base station 110 could provide UL/SL grants in a separate search space (as shown in FIG. 2).

In an embodiment, each service-specific search space can support a different CCE scheduling algorithm, which is optimal for that particular service.

Embodiments of the invention achieve a better CCE resource utilization by having more opportunities to arrange the search space based on the service demands and achieve a lower blocking probability. According to embodiments of the invention TDM based search design for low latency service and FDM based search space design for services requiring high latency, massive connection can be supported in the same TTI. According to embodiments of the invention DMRS like pilot design for TDM search space design can be used for faster decoding, while FDM search space can rely on DMRS for data.

In embodiments of the invention, by means of the service aware RRC layer, the L2 layer can notify the PHY layer about the configured service in each sub-frame and the PCSICH can provide the pointer to the corresponding service-specific search space.

Since groups of UEs with similar services can be assigned to service-specific search spaces, embodiments of the invention support both multiple-services, such as eMBB, URLLC, as well as mixed scenario services, such as high reliability—low latency best effort services.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A first communication device configured for a plurality of communication services, including a first communication service and a second communication service, in a wireless communication network on the basis of a plurality of communication resources, the first communication device comprising:
   a processor configured to allocate:
      a first control channel associated with the first communication service to a first service-specific control region of the plurality of communication resources, and a second control channel associated with the second communication service to a second service-specific control region of the plurality of communication resources, wherein the first service-specific control region is associated with a first service-specific user data region of the plurality of communication resources, and the second service-specific control region is associated with a second service-specific user data region of the plurality of communication resources; and
      a control service indicator channel to a common control region of the plurality of communication resources of a radio frame, wherein the control service indicator channel comprises information about a location and a configuration of the first service-specific control region and the second service-specific control region in the radio frame; and
   a communication interface configured to transmit to a second communication device the radio frame.

2. The first communication device of claim 1, wherein the processor is further configured to allocate a common control channel to the common control region of the plurality of communication resources of the radio frame.

3. The first communication device of claim 1, wherein the information about the location and the configuration of the first service-specific control region and the second service-specific control region in the radio frame-comprises at least one of the following:
   a pointer to the resources of a respective service-specific control region;
   a scaling factor of a Physical Hybrid Automatic Repeat Request Indicator Channel (PHICH) allocated in the respective service-specific control region;
   candidates for a service-specific search space;
   an aggregation level for the service-specific search space;
   a number of tiles comprising a numerology setting for each tile; or
   a region for contention-based access.

4. The first communication device of claim 1, wherein the first service-specific control region and the first service-specific user data region are located in a first tile of the plurality of communication resources and the second service-specific control region and the second service-specific user data region are located in a second tile of the plurality of communication resources.

5. The first communication device of claim 4, wherein the processor is further configured to configure the first tile with different tile parameters than the second tile, in particular with at least one of a different sampling frequency, a different number of sub-carriers, or a different sub-carrier spacing.

6. The first communication device of claim 1, wherein the plurality of communication resources are associated with a plurality of frequencies defining a frequency range, and wherein the processor is further configured to allocate at least one of the first control channel or the second control channel at different, in particular lower frequencies of the frequency range than at least one of the first service-specific user data region or the second service-specific user data region.

7. The first communication device of claim 1, wherein the processor is further configured to provide a level 1 downlink control region in the control region of a first OFDM symbol of the radio frame, wherein the level 1 downlink control region comprises information about service-specific level 2 downlink control regions.

8. A method of operating a first communication device configured for a plurality of communication services, including a first communication service and a second communication service, in a wireless communication network on the basis of a plurality of communication resources, the method comprising:
   allocating a first control channel associated with the first communication service to a first service-specific control region of the plurality of communication resources, and a second control channel associated with the second communication service to a second service-specific control region of the plurality of communication resources, wherein the first service-specific control region is associated with a first service-specific user data region of the plurality of communication resources, and the second service-specific control region is associated with a second service-specific user data region of the plurality of communication resources;
   allocating a control service indicator channel to a common control region of the plurality of communication resources of a radio frame, wherein the control service indicator channel comprises information about a location and a configuration of the first service-specific control region and the second service-specific control region in the radio frame; and
   transmitting to a second communication device the radio frame.

9. A computer program product, comprising program code stored on a non-transitory computer readable medium, wherein the program code causes a processor to perform the method of claim 8 when executed on a computer.

10. A second communication device configured to use one or more of a plurality of communication services, including a first communication service and a second communication service, in a wireless communication network on the basis of a plurality of communication resources, the second communication device comprising:
   a communication interface configured to receive from a first communication device of the wireless communication network a radio frame comprising the plurality of communication resources; and
   a processor configured to decode:
      a first control channel associated with the first communication service by accessing a first service-specific control region of the plurality of communication resources, and a second control channel associated with the second communication service by accessing a second service-specific control region of the plurality of communication resources, wherein the first service-specific control region is associated with a first service-specific user data region of the plurality of communication resources, and the second service-specific control region is associated with a second service-specific user data region of the plurality of communication resources; and a control service indicator channel by accessing a common control region of the plurality of communication resources of the radio frame, wherein the control service indicator channel comprises information about a location and a configuration of the first service-specific control region and the second service-specific control region in the radio frame.

11. The second communication device of claim 10, wherein the processor is further configured to decode a common control channel by accessing the common control region of the plurality of communication resources of the radio frame.

12. The second communication device of claim 10, wherein the information about the location and the configuration of the first service-specific control region and the second service-specific control region in the radio frame comprises at least one of the following:
   a pointer to the resources of a respective service-specific control region;
   a scaling factor of a Physical Hybrid Automatic Repeat Request Indicator Channel (PHICH) allocated in the respective service-specific control region;
   candidates for a service-specific search space;
   an aggregation level for the service-specific search space;
   a number of tiles comprising a numerology setting for each tile; or
   a region for contention-based access.

13. The second communication device of claim 10, wherein the first service-specific control region and the first service-specific user data region are located in a first tile of the plurality of communication resources and the second service-specific control region and the second service-specific user data region are located in a second tile of the plurality of communication resources.

14. The second communication device of claim 13, wherein the processor is further configured to process the first tile with different tile parameters than the second tile, in particular with at least one of a different sampling frequency, a different number of sub-carriers, or a different sub-carrier spacing.

15. The second communication device of claim 10, wherein the plurality of communication resources are associated with a plurality of frequencies defining a frequency range and wherein the processor is further configured to decode at least one of the first control channel or the second control channel at different, in particular lower frequencies of the frequency range than at least one of the first service-specific user data region or the second service-specific user data region.

* * * * *